April 7, 1970 — C. G. MATSON — 3,504,786
CONVEYOR CLEANER
Filed Jan. 2, 1968 — 2 Sheets-Sheet 1
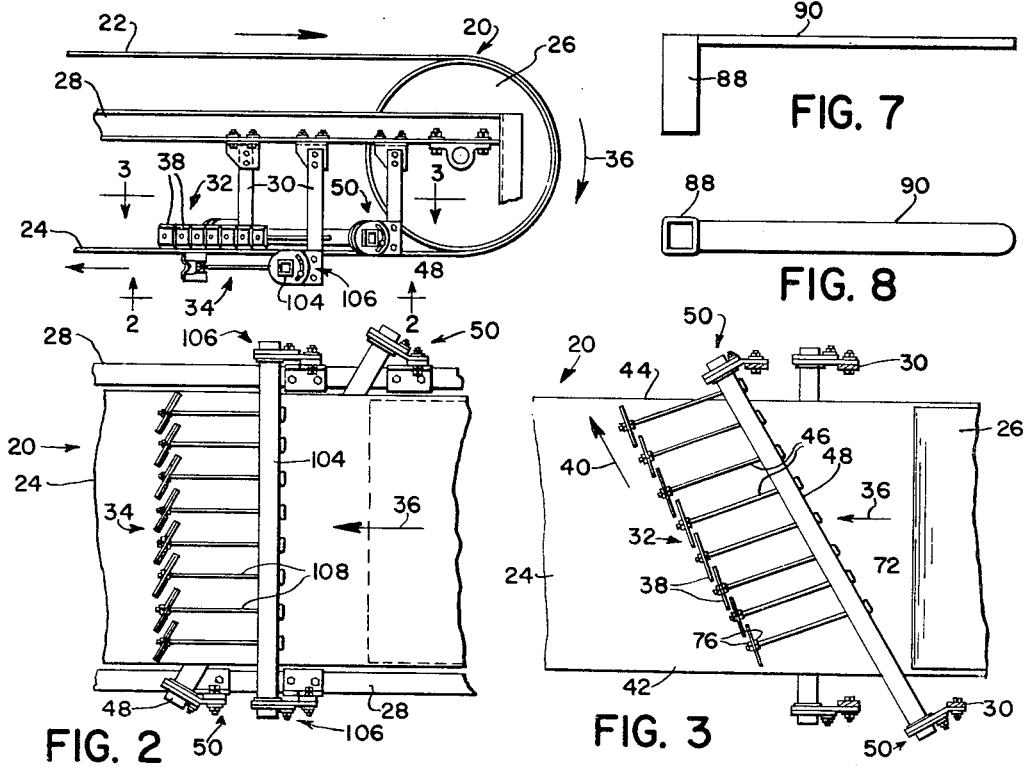
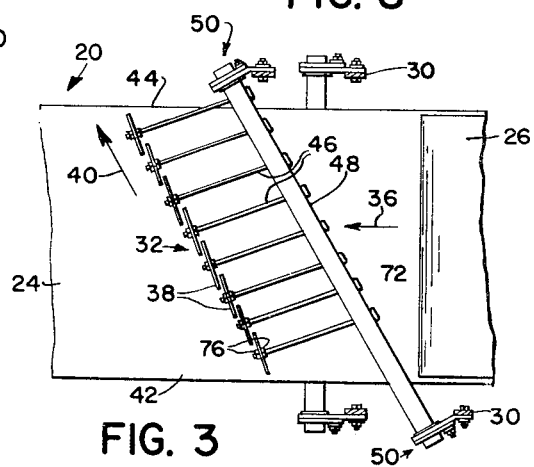
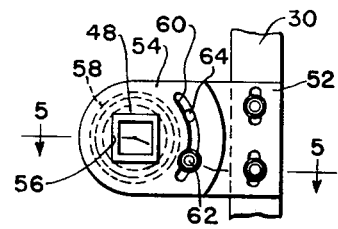
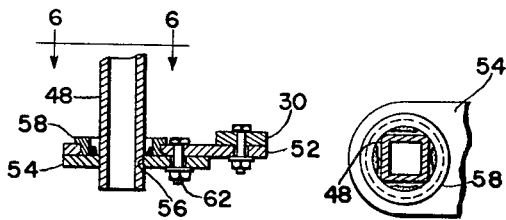
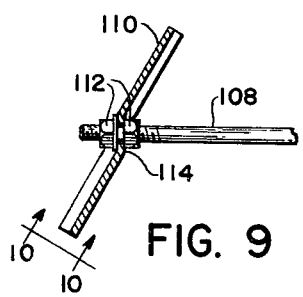
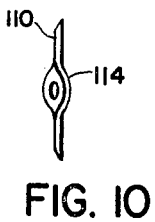
INVENTOR.
CARL G. MATSON April 7, 1970   C. G. MATSON   3,504,786
CONVEYOR CLEANER
Filed Jan. 2, 1968   2 Sheets-Sheet 2
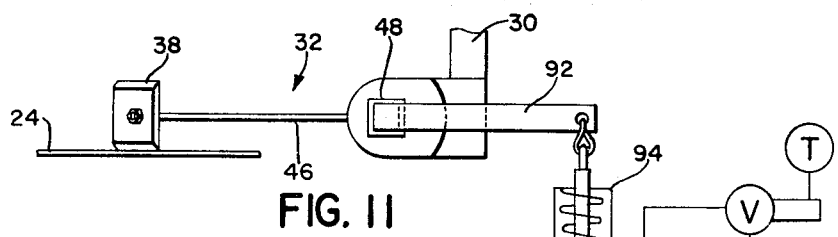
FIG. 11
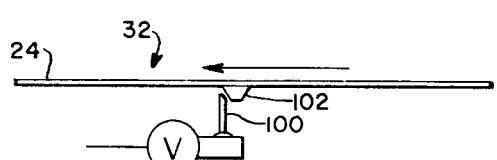
FIG. 12
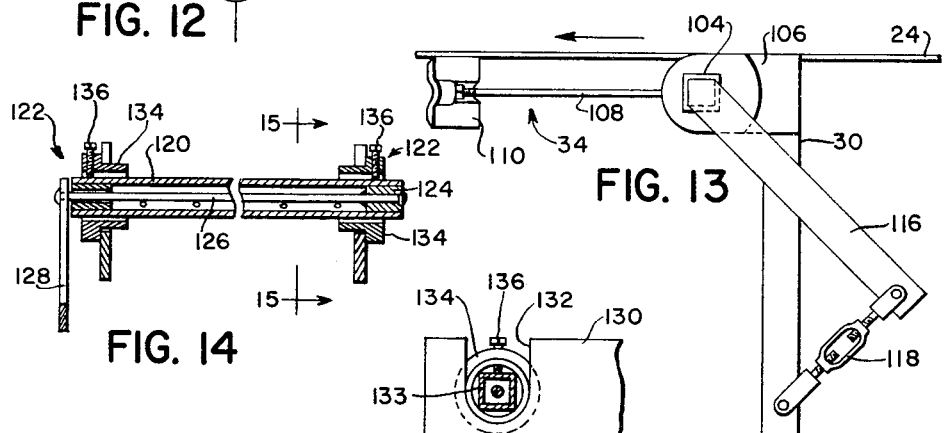
FIG. 13
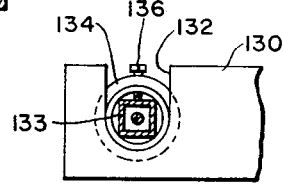
FIG. 14
FIG. 15
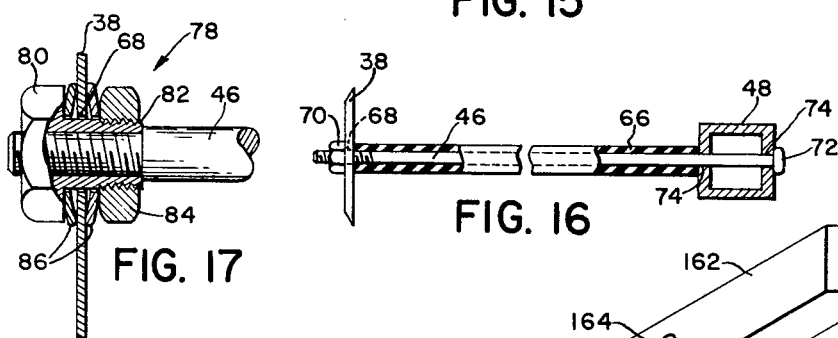
FIG. 17   FIG. 16
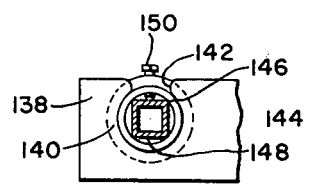
FIG. 18
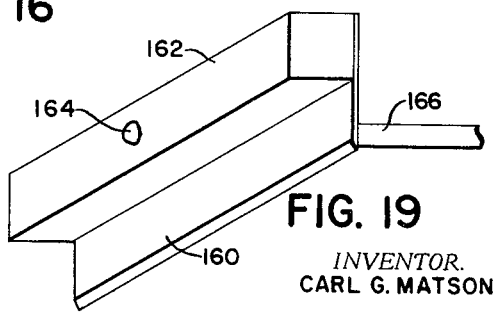
FIG. 19
INVENTOR.
CARL G. MATSON United States Patent Office 3,504,786
Patented Apr. 7, 1970

3,504,786
CONVEYOR CLEANER
Carl G. Matson, 401 E. Central Blvd.,
Kewanee, Ill. 61443
Filed Jan. 2, 1968, Ser. No. 695,049
Int. Cl. B65g 45/00
U.S. Cl. 198—230
9 Claims

ABSTRACT OF THE DISCLOSURE

A conveyor cleaner or belt scraper especially adapted to scrape the upper surface of the lower or return run of an endless belt conveyor and constructed to provide a plurality of blades arranged diagonally of the length of the run in overlapping echelon fashion so as to cause the scraped material to be directed toward and discharged at one edge of the run.

BACKGROUND OF THE INVENTION

It is well known that endless belt conveyors accumulate material thereon during operation and that, unless this material is scraped off either continuously or intermittently, the build-up interferes with efficient operation. Several such scrapers have been patented, primarily as evidenced by such U.S. Patents as 1,975,591 and 3,342,312, but all of these operate on the principle of cleaning the under or bottom surface of the return run of the belt, because, obviously, to scrape the top surface of the upper or delivery run is merely to scrape off the material being conveyed. So far as is known, no patentee has recognized the need for scraping the inside of the belt; that is, either the underside of the delivery run or the top side of the return run.

SUMMARY OF THE INVENTION

The present invention recognizes that it does little good to scrape the underside of the delivery run of the conveyor because the scraped material simply falls onto the upper surface of the return run and build-up is not prevented, resulting in accumulation of material on the conveyor rollers and leading to excessive belt tension, uneven operation and requiring expensive and time-consuming shut-downs to enable manual cleaning of the conveyor. Solving this problem, the invention resides primarily in the use of a scraper or cleaner that operates on the top surface of the return run of the conveyor and more particularly in the arrangement of the scraper as a plurality of separate blades arranged diagonally to the length of that run in overlapping echelon fashion so that each blade discharges scraped material to its downstream neighbor until finally the most downstream blade at the far edge of the run directs the scraped material completely off of the run, preferably into the main receiving hopper or a suitable container associated therewith. Further, the blades are individually mounted in such manner that each one partakes of a vibratory action independently of the other, functioning thus to scrape the belt portion efficiently and cleanly and to further assure the downstream diagonal transfer of material to the next blade and so on. A further feature of the invention is that the blades are also individually mounted on their associated mount members by resilient means adding to the vibratory or flutter action. Still further, the blade mounting support is mounted on the conveyor frame for easy removal, for rockability to vary the blade pressure on the conveyor and for automatic intermittent scraping action so that, if desired, the blades need not always assume their scraping positions.

DESCRIPTION OF THE DRAWINGS

FIG. 1 is a fragmentary side view of the discharge end portion of a typical conveyor.

FIG. 2 is a bottom view as seen along the line 2—2 on FIG. 1.

FIG. 3 is a top view as seen along the line 3—3 on FIG. 1.

FIG. 4 is an enlarged end view of bracket means for mounting the cross support.

FIG. 5 is a section on the line 5—5 of FIG. 4.

FIG. 6 is a view along the line 6—6 of FIG. 5.

FIG. 7 is a top view of one form of lever arm for rocking the blade support.

FIG. 8 is a side view of the same.

FIG. 9 is an enlarged view of a form of blade and mounting as used in FIG. 2.

FIG. 10 is an edge view of the blade of FIG. 9.

FIG. 11 is a fragmentary enlarged view showing one form of automatic intermittent scraping operation.

FIG. 12 is a similar view showing another automatic means.

FIG. 13 is a side view showing a modified form of means for applying a turning force to the blade support.

FIG. 14 is a sectional view of a further form of means for applying torsion to the blade support.

FIG. 15 is a side view similar to FIG. 6 but showing a modified form of support bracket means.

FIG. 16 is an enlarged view showing one form of blade and mounting member assembly.

FIG. 17 is an enlarged fragmentary sectional view illustrating a resilient blade mount.

FIG. 18 is a view similar to FIGS. 6 and 15 but showing a further modified form of support bracket means.

FIG. 19 is a perspective of a modified blade.

DESCRIPTION OF PREFERRED EMBODIMENTS

FIG. 1 shows the discharge end portion of a conveyor belt 20, here selected as representative of typical conveyors, having an upper or delivery run 22 and a lower or return run 24, the belt being trained as usual about a drum or roller 26 conventionally carried in conveyor frame means 28 which includes a plurality of uprights 30, here exploited to mount an inner scraper means 32 and an outer scraper means 34.

The scraper means 32 is mounted over the upper surface of the conveyor return run 24, the direction of movement of which is indicated by the arrow 36. Hence, and looking at FIG. 3, the downstream direction of the run 24 is to the left. This applies also to FIG. 2.

The scraper means 32 comprises a plurality of separate or individual blades 38, preferably of appropriate sheet material such as steel; although, the precise type of material is not pertinent here. These blades are arranged in overlapping echelon fashion diagonally to the run 24 so that, considered as a set of blades, the most upstream blade is at one edge of the conveyor (the bottom edge as seen in FIG. 3) and the most downstream blade is at the other edge. Thus, the bottommost (FIG. 3), or upstreammost, blade 38 delivers diagonally to the next adjacent blade and so on until the scraped material is ultimately delivered off the opposite edge of the run, in general the path of the scraped material following the direction of the arrow 40. Stated otherwise, and giving the opposite edges of the lower run the reference numerals 42 and 44, the scraped material is compelled to move by the scraper blades 38 from edge 42 to edge 44 in the direction of the arrow 40. The scraper means 32 and 34 are preferably located near the discharge end of the conveyor so that the material scraped off may be led to the hopper or other receptacle to which the conveyor is intended to deliver (not shown).

The blades 38 are individually mounted by separate elongated, rod-like members 46 on a diagonal support 48, here a tube of square cross-section, interposed between the conveyor runs and carried at opposite terminal ends on the conveyor frame means uprights 30 by bracket means 50, each of which has a part 52 rigidly attached to the associated upright 30 and a companion part 54. The part 54 has a square opening 56 therein which conforms to and tolerably receives the square section of the tube or support 48 and which also includes a circular collar 58 welded thereto and flanged to confine the support 48 against lengthwise or axial movement. The part 54 further has an arcuate slot 60 therein through which securing means, here a bolt and nut assembly 62, is passed to secure the bracket part 54 in selected positions of adjustment, the other bracket part 52 having a pair of openings therein for receiving the bolt, one of which openings is shown at 64 and the other of which is filled by the bolt. This arrangement increases the angular range of adjustment of the support 48 about its longitudinal axis. For example, the length of the slot 60 is here selected as 60° but the spacing between the openings 64 is 30° to the adjustment range of the tube or support 48 simply by switching the bolt to the other hole.

The angle of the support 48 to the transverse line of the conveyor run 24 is preferably about 30° and the support is in general parallelism with the diagonal arrangement of the set of blades 38 so that the members or rods 46 may be straight and without bends. The 5° offset provides the necessary spacing between the blades. These members 46 are preferably steel rods and each carries an encircling sleeve or tube 66 (FIG. 16), one end of which abuts the support tube 48 and the other of which abuts the near side of the associated blade 38, the free end of the rod or member 46 being threaded and the blade 38 being mounted on the rod by means of an aperture 68 therein and a completing nut 70 threaded on the rod 46. In one form of construction, each rod 46 has a headed support-proximate end, as at 72, and the sleeve 66 is a spacer between the support 48 and its blade 38, thus rigidly affixing the rod 46 to the support and the other end of the sleeve 66 abutting the rear face of the blade, it being clear that opposed walls of the support are apertured in alinement to receive the rod 46, as at 74 (FIG. 16). In another form of construction (FIG. 3), the blade may be confined on the rod 46 by a pair of nuts 76. The support 48 may be cross drilled to provide several extra pairs of holes for receiving additional rods 46 or for receiving such rods at different locations, as when the support is to be shifted crosswise of the conveyor.

In still another form of blade mounting (FIG. 17) a self-contained mounting unit 78 may be employed. This unit includes an abutment 80 in the form of a hollow, internally threaded bolt having a shank 82 passed through the aperture 68 in the blade and threaded onto the externally threaded free end of the rod 46 and carrying means in the form of a nut 84 which confines a pair of spring washers 86 at opposite sides of the blade 38. These washers may be of any well-known concavo-convex type and the shouldered shank 82 assures that the unit may be pre-assembled with the blade and simply screwed onto the rod 46 without changing the compression force applied to the washers by the abutment 80 and nut 84. This means that the spring load may be set at the factory and the blade-unit assembly installed without special attention by the user.

Regardless of the type of connection between each blade 38 and its rod 46, there is inherent in the construction a desirable vibratory or fluttering action of the blades as they ride the belt at the upper surface of the lower run 24. Each blade is independent of the others. The arrangement of the support angle and the blade angle means that the rods 46 may be free of bends, insuring proper action of the blades. As a practicable construction feature, the rods 46 are at about 85° to the length of the support 48, which enables provision for the echelon overlap of the blades, but still the holes through the support 48 may be drilled in a straight line, leaving the rods 46 straight so that each blade may partake of the necessary action relative to the length of its rod 46. The individual action of the blades is significant when it is recognized that material build-up on the conveyor surface is not uniform and one blade may have a greater scraping responsibility than another. Especially with the mounting of FIG. 17 is the vibrating action improved, since the blade has virtually universal spring-loaded action relative to its rod. This is also true with the rod-sleeve arrangement of FIG. 16 when the sleeves are formed of elastomer material having some degree of rigidity to serve as spacers but also possessing a degree of elasticity to enable desired action of the associated blade.

The foregoing applies broadly to a situation in which the support 48 is selectively adjustably mounted by the bracket means 50, in which case, once the adjustment is attained, it is retained by the bolt means 62. For the purposes of securing this adjustment, a lever as shown in FIGS. 7 and 8 may be used. This lever has a plug end 88 and an arm 90 rigidly attached thereto. The size of the plug end 88 is such that it may fit inside or outside the tubular support 48 and the user may apply a manual force to obtain the necessary rocking action of the support 48 once the bolt means 62 is loosened. When the proper adjustment is attained, the bolt means 62 is tightened and the scraper functions in its scraping position at all times, it being clear that the angular position of the support 48 about its axis determines the pressure applied by the blades 38 to the conveyor.

Since it may not be necessary to apply the scraping function at all times, resort may be had to the application of scraping pressure intermittently, one form of system being shown in FIG. 11, wherein the support 48 has attached to one end thereof a lever arm 92 against which acts a spring-loaded fluid-pressure motor 94 anchored to a conveyor frame part 96. The spring within the motor normally acts to bias the blades 38 away from the conveyor run 24, but a fluid pressure source or pump P supplies pressure through a valve V to the motor to apply torque to the support 48 via the arm 92, the valve being responsive to a timing means T to actuate the valve at timed intervals. That is to say, for a predetermined period, the blades 38 will be free from or in non-scraping relation to the belt, but at other periods the scraping action will become effectuated.

FIG. 12 illustrates another situation in which the scraping action is brought about at intervals depending upon travel of the conveyor, a representative system being shown in which the valve V is opened in response to an actuator 100 tripped by a lug 102 on the conveyor. That is to say, for each circuit of the conveyor, the valve V will be opened to apply pressure to the motor 94 for a predetermined interval, after which the motor will be spring-loaded to move the blades out of engagement with the conveyor. Any of the well known types of micro-switches, time-delays etc. may be used.

The problems of scraping the bottom surface of the return run 24 are not as acute as those described above, because it is not necessary to guide the scraped material to one side of the conveyor, it being clear that once the material is scraped off the belt surface, it will drop by gravity. Never-the-less, many of the features described above may be applied, especially as respects the mounting of a cross support 104, which, in the form shown in FIGS. 1 and 2, includes bracket means 106 similar to those described above at 50. In this case, the support tube 104, which may be of square cross-section, carries a plurality of rod-like members 108, to each of which is affixed a blade 110, the mounting of which may be effected by a pair of opposed nuts 112, comparable to the nuts 76, or by any of the mounting means previously described. In this suitation, the support 104 may be normal to the length of the conveyor and the rods 108 are normal to the support, requiring that the blades be specially formed so as to occupy an angled position relative to the conveyor, if only to accommodate the transverse splice usually found in conveyors. For this purpose, each blade 110 has a central offset 114 (FIGS. 9 and 10). This enables the use of straight rods 108.

FIG. 13 illustrates another means for applying pressure to a blade-mounting support, this figure showing the support 104 and a blade 110, but it being clear that this arrangement could be applied equally well to the scraper means 32. Likewise, the systems of FIGS. 7–8, 11 and 12 could be applied to the scraper means 34. In FIG. 13, the support 104 has a lever arm 116 affixed thereto and this lever arm is compelled in a force-applying direction by any suitable force applying means, here shown as a turnbuckle 118 acting on the conveyor frame means upright 30. Any equivalent means could be used.

FIG. 14 illustrates a construction in which a torsion bar system is employed, a support 120, comparable to the supports 48 or 104, being shown as being carried by bracket means 50 previously described. In the present instance, the support 120, preferably of square cross section, is fitted at one end with a plug 124 to which one end of an elongated torsion bar 126 is rigidly attached, the free end of the torsion bar extending outwardly to carry rigidly thereon a force-applying lever means 128. This lever could be connected to any of the previously described means for applying force, such as FIGS. 7–8, 11, 12 or 13.

It is advantageous to be able to mount the supports 48 and/or 104, 120 for ready removal. FIG. 15 shows one such arrangement, in which a bracket part 130 has a slot 132 therein and a support 133 is fitted with a circular collar 134 maintained against axial displacement by a set screw 136. The slot 132 is dimensioned to receive the collar and has a semi-circular bottom in which the collar can be rockably received to permit angular adjustment, as by any of the means hereinbefore described.

A variation is shown in FIG. 18, in which a bracket part 138 has a keyhole slot 140 including a narrow mouth or entrance opening 142 and an adjoining circular opening part 144 of a size to receive a collar 146 on a support 148. The dimension of the mouth part 142 is such as to easily receive the support 148 according to its narrowest dimension, the collar 146, having a set screw 150, being temporarily slid axially out of the way. After the tubular support 148 is fitted through the opening or mouth 142, the collar 146 is slid back into place, its outside diameter filling the opening 144 and the set screw being tightened to retain the assembly against relative axial displacement. A similar mounting occurs at the other end of the support. Not only may this arrangement be applied to either of the blade sets 32 or 34, but it may be equipped with any of the force-applying means already described.

The blade shown in FIG. 19 is of two-piece construction, including a relatively thin scraper 160 attached to a bank-up block 162 which has a tapped bore 164 for receiving a mounting rod 166. When the thin scraper wears excessively, the block 162 will ride the belt and will not allow the rod 116 to dig into the belt.

As will be apparent, the various combinations may be utilized together or separately, either with or without any of the other specially designed means, and in torsional force-applying means, whether manually or automatically applied, may be utilized with any construction. Features not categorically described will be readily apparent to those skilled in the art:

I claim:

1. A conveyor cleaner for an endless belt conveyor having delivery and return runs, a support traversing one of the runs and a plurality of belt-scraper blades arranged in echelon fashion from one edge to the other of said run and means mounting the blades on the support, characterized in that the mounting means comprises a plurality of members, one for and connected to each blade and to the support, each member is of elongated rod-like construction rigidly affixed to the support, and each member is encircled by a sleeve having one end abutting the support and its opposite end abutting the respective blade.

2. A conveyor cleaner for an endless belt conveyor having delivery and return runs, a support traversing one of the runs and a plurality of belt-scraper blades arranged in echelon fashion from one edge to the other of said run and means mounting the blades on the support, characterized in that the mounting means comprises a plurality of members, one for and connected to each blade and to the support, each member is of elongated rod-like construction rigidly affixed at one end to the support and having resilient means connecting its other end to the associated blade, each blade has an aperture therein through which its associated member extends and each resilient means includes an abutment on the associated member, an apertured spring washer fitting and secured to the associated member, and compression means on the associated member biasing the associated blade against the associated abutment.

3. The invention defined in claim 2 in which each abutment, its spring washer and its compression means comprise a self-contained unit passing through the blade aperture and engaging the blade from opposite sides, said unit including means for the mounting thereof on the associated member.

4. The invention defined in claim 3, in which, each unit is internally threaded and each member is externally threaded at its blade-proximate end and threadedly receives the associated unit.

5. A conveyor clearner for an endless belt conveyor having delivery and return runs, a support traversing one of the runs and a plurality of belt-scraper blades arranged in echelon fashion from one edge to the other of said run and means mounting the blades on the support, characterized in that the conveyor includes frame means and means is provided for removably carrying the support on said frame means, including brackets respectively at opposite edges of the conveyor and each bracket has upwardly opening slots therein for receiving the support, each slot being of key-hole shape having an entrance opening large enough to receive the support and a circular adjoining opening part of larger diameter than said entrance opening, and collar means are lengthwise slidable on the support to respectively fit said adjoining openings.

6. A conveyor cleaner for an endless belt conveyor having delivery and return runs, a support traversing one of the runs and a plurality of belt-scraper blades arranged in echelon fashion from one edge to the other of said run and means mounting the blades on the support, characterized in that the conveyor includes frame means and means is provided for removably carrying the support on said frame means, including brackets respectively at opposite edges of the conveyor and each bracket has upwardly opening slots therein for receiving the support, each support being of non-circular section and each bracket includes a support fiting part and a frame-means-carried part and means interconnecting the two parts for selectively relative angular adjustment about the lengthwise axis of the support.

7. The invention defined in claim 6, including means for securing the respective parts together in selected positions of angular adjustment.

8. A conveyor cleanor for an endless belt conveyor having delivery and return runs, a support traversing one of the runs and a plurality of belt-scraper blades arranged in echelon fashion from one edge to the other of said run and means mounting the blades on the support, characterized in that the support is a rockable tubular element and the mounting means comprises a plurality of members, one for and connected to each blade and to the support, and a torsion bar extends into said element and has an inner end within and affixed to said element and an outer end outside said element, and means is connected to said outer end for stressing said bar in torsion to rock the element in a direction pressing the blades on said run.

9. The invention defined in claim 8, further characterized in that the inner end of the bar is affixed to and within the element by a plug and the portion of the bar adjacent to its outer end is associated with the element by a sleeve-like guide.

References Cited

UNITED STATES PATENTS

| | | | |
|---|---|---|---|
| 1,889,055 | 11/1932 | Weaton et al. | |
| 2,563,444 | 8/1951 | Young | 198—188 |
| 2,794,540 | 6/1957 | Sinden | 198—230 |
| 3,315,794 | 4/1967 | Ellington | 198—230 |
| 3,342,312 | 9/1967 | Reiter | 198—230 |

HUGO O. SCHULTZ, Primary Examiner

U.S. Cl. X.R.

74—230